(12) United States Patent
Moon et al.

(10) Patent No.: US 12,159,079 B2
(45) Date of Patent: Dec. 3, 2024

(54) ELECTRONIC DEVICE FOR PROVIDING STREAMING SERVICE AND METHOD THEREOF

(71) Applicant: SAMSUNG ELECTRONICS CO., LTD., Suwon-si (KR)

(72) Inventors: Joonseok Moon, Suwon-si (KR); Seohyang Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/889,967

(22) Filed: Aug. 17, 2022

(65) Prior Publication Data

US 2023/0097286 A1 Mar. 30, 2023

Related U.S. Application Data

(63) Continuation of application No. PCT/KR2022/011054, filed on Jul. 27, 2022.

(30) Foreign Application Priority Data

Sep. 28, 2021 (KR) .................. 10-2021-0127779

(51) Int. Cl.
*G06F 3/14* (2006.01)
*G06F 3/147* (2006.01)
(Continued)

(52) U.S. Cl.
CPC ............ *G06F 3/1454* (2013.01); *G06F 3/147* (2013.01); *H04L 65/1101* (2022.05); *H04L 65/60* (2013.01); *H04W 4/029* (2018.02)

(58) Field of Classification Search
None
See application file for complete search history.

(56) References Cited

U.S. PATENT DOCUMENTS 9,509,944 B2 11/2016 Micewicz
11,019,195 B2 5/2021 Ledvina et al.
(Continued)

FOREIGN PATENT DOCUMENTS

KR 10-2012-0056698 A 6/2012
KR 10-2012-0084164 A 7/2012
(Continued)

OTHER PUBLICATIONS

Communication dated Nov. 2, 2022, issued by the International Searching Authority in counterpart International Application No. PCT/KR2022/011054 (PCT/ISA/210).
(Continued)

*Primary Examiner* — Ifedayo B Iluyomade
(74) *Attorney, Agent, or Firm* — Sughrue Mion, PLLC

(57) ABSTRACT

An electronic device according to various embodiments disclosed in this document may include wireless communication circuitry, a memory, and a processor operatively connected to the memory and the wireless communication circuitry. The processor may be configured to identify a location of a terminal in an area in which a plurality of display devices have been installed and select one of the plurality of display devices, receive content from the terminal through the wireless communication circuitry and convert a first form of the content into a second form of the content, the second form being supported in the selected one display device, and stream the content in the second form, to the selected one display device based on a User Datagram Protocol (UDP) protocol.

18 Claims, 9 Drawing Sheets

(51) Int. Cl.
 *H04L 65/1101* (2022.01)
 *H04L 65/60* (2022.01)
 *H04W 4/029* (2018.01)

(56) References Cited

U.S. PATENT DOCUMENTS

| | | | | |
|---|---|---|---|---|
| 2016/0094648 | A1* | 3/2016 | Han | H04W 4/80 |
| | | | | 709/209 |
| 2018/0158316 | A1 | 6/2018 | Ham et al. | |
| 2021/0006652 | A1* | 1/2021 | Ledvina | H04L 51/58 |

FOREIGN PATENT DOCUMENTS

| | | |
|---|---|---|
| KR | 10-2013-0104458 A | 9/2013 |
| KR | 10-1358814 B1 | 2/2014 |
| KR | 10-2016-0020088 A | 2/2016 |
| KR | 10-2016-0126448 A | 11/2016 |
| KR | 10-1874938 B1 | 7/2018 |

OTHER PUBLICATIONS

Communication issued Sep. 11, 2024 by European Patent Office in European Application No. 22876649.9.

* cited by examiner

ELECTRONIC DEVICE FOR PROVIDING STREAMING SERVICE AND METHOD THEREOF

CROSS-REFERENCE TO RELATED APPLICATIONS

This application is a national stage of International Application No. PCT/KR2022/011054 designating the United States, filed on Jul. 27, 2022, in the Korean Intellectual Property Receiving Office and claiming priority to Korean Patent Application No. 10-2021-0127779, filed Sep. 28, 2021, in the Korean Intellectual Property Office, the disclosures of which are incorporated by reference herein in their entireties.

TECHNICAL FIELD

Various embodiments disclosed in this document relate to an electronic device providing a streaming service, and relate to an electronic device, which provides a streaming service to multiple display devices, for example.

BACKGROUND ART

With the development of a network communication technology, an electronic device is equipped with a wired communication function and various wireless communication functions, such as UWB and Wi-Fi, and the electronic device may be connected to various external electronic devices including a mobile terminal, such as a mobile communication terminal, a personal digital assistant (PDA), an electronic notebook or a smartphone, over a wired or wireless network, may perform communication, and may provide various services, such as a content streaming service.

DETAILED DISCLOSURE

Technical Problem

If a user of an electronic device wants to watch content in a display device requested by a mobile terminal, the user performs a complicated process of specifying a display device and requesting a streaming service. Furthermore, since a significant time up to a communication connection between the electronic device and the specified display device and subsequent content streaming is taken, the time that the content is provided in the specified display device may be delayed. Meanwhile, the aforementioned process needs to be performed again if the content is to be watched in another display device because the mobile terminal can move to another location.

Various embodiments of the disclosure are for providing, by an electronic device, a content streaming service to an external display device based on a location of a mobile terminal.

Objects to be solved in the disclosure are not limited to the aforementioned objects, and the other objects not described above may be evidently understood from the following description by a person having ordinary knowledge in the art to which the disclosure pertains.

Technical Solution

An electronic device according to various embodiments disclosed in this document may include wireless communication circuitry, a memory, and a processor operatively connected to the memory and the wireless communication circuitry. The processor may be configured to identify a location of a terminal in an area in which a plurality of display devices have been installed and select one of the plurality of display devices, receive content from the terminal through the wireless communication circuitry and convert a first form of the content into a second form of the content, the second form being supported in the selected one display device, and stream the content in the second form, to the selected one display device based on a User Datagram Protocol (UDP) protocol.

A method of an electronic device according to various embodiments disclosed in this document may include identifying a location of a terminal in an area in which a plurality of display devices have been installed; selecting one of the plurality of display devices based on the location of the terminal; receiving content from the terminal and converting a first form of the content into a second form of the content, the second form being supported in the selected one display device; and streaming the content in the second form, to the selected one display device based on a UDP protocol.

A method for controlling an electronic device for seamless streaming service, the method executed by a processor, the method including identifying an approach of a mobile device to an area in which a plurality of display devices are disposed; selecting one of the plurality of display devices based on the approach of the mobile device; receiving content from the mobile device and converting a first form of the content into a second form of the content, the second form of the content being supported in the selected one display device; and streaming the content in the second form to the selected one display device based on a UDP protocol.

Advantageous Effects Disclosure

The electronic device according to various embodiments disclosed in this document can identify a location of a mobile terminal or mobile device and stream content to a display device based on the location.

The electronic device according to various embodiments can reduce delay according to a communication connection with a display device and content streaming, and can provide a seamless streaming service.

The electronic device according to various embodiments can seamlessly stream content to another display device based on a movement of a location of a mobile terminal.

In addition, various effects directly or indirectly understood through this document may be provided.

BRIEF DESCRIPTION OF DRAWINGS

In relation to the description of the drawings, the same or similar reference numerals may be used with respect to the same or similar constituent elements, in which in which.

DETAILED DESCRIPTION

Figure 1:
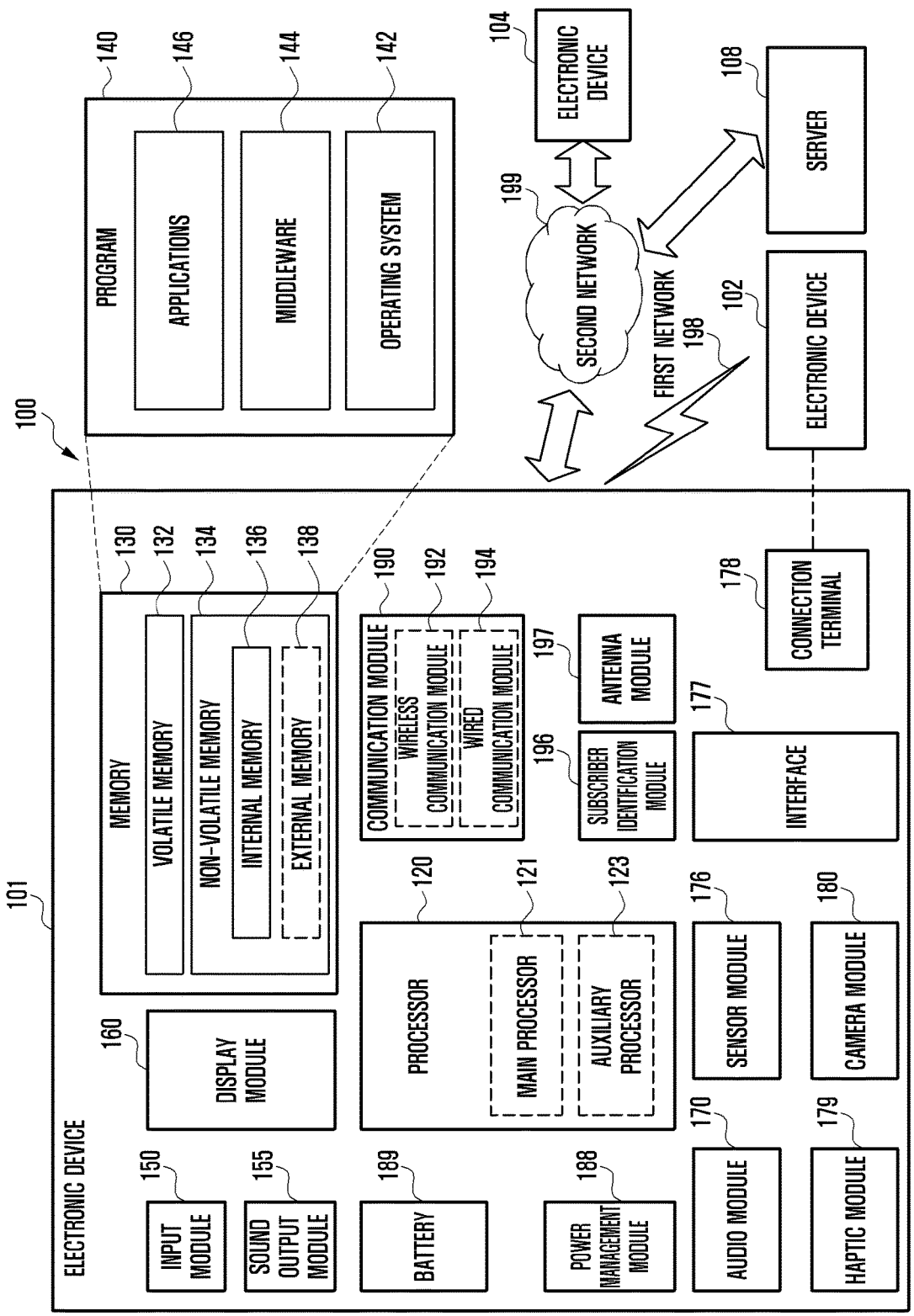
FIG. 1 is a block diagram of a mobile terminal within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
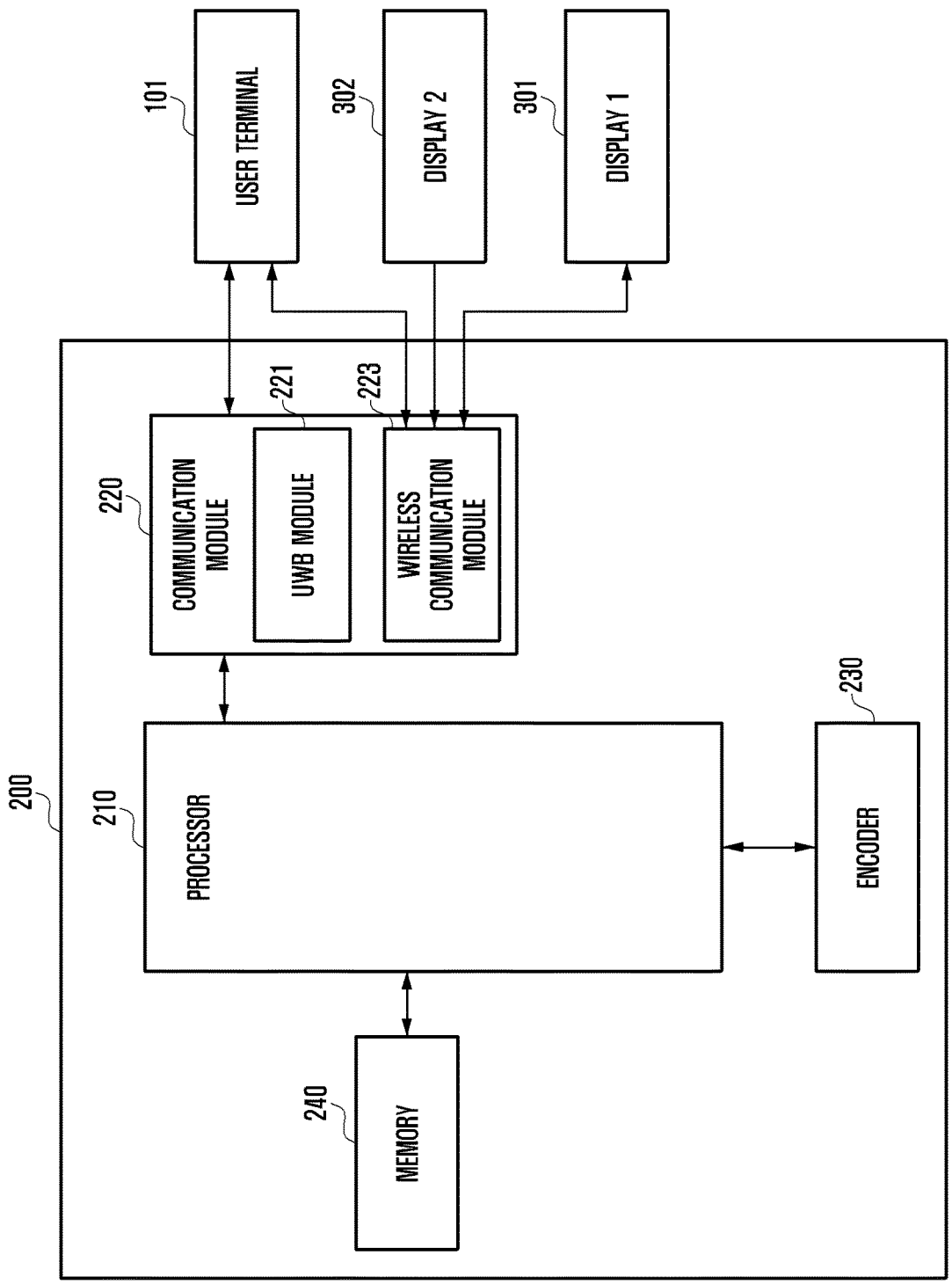
FIG. 2 is a block diagram of an electronic device within a network environment, which communicates with a mobile terminal and a plurality of display devices according to various embodiments.

FIG. 2 is a schematic block diagram of an electronic device 200 within a network environment, which communicates with a mobile terminal (e.g., the electronic device 101 in FIG. 1) and a plurality of display devices 301 and/or 302 according to various embodiments. The electronic device 200 may be constituted to include one or more of the components illustrated in FIG. 2.

With reference to FIG. 2, the electronic device 200 may include a processor 210, a communication module 220, an encoder 230, and a memory 240. In addition, the electronic device 200 may further include components necessary to perform various operations that are described later.

The processor 210 may control at least another component (e.g., a hardware or software component) of the electronic device 200 connected to the processor 210 by executing software (e.g., the program 140), and may perform various types of data processing or operations.

According to an embodiment, the processor 210 may store, in a volatile memory of the memory 240, an instruction or data received from another component (e.g., the communication module 220) and process a stored instruction or data, as at least part of data processing or an operation. To this end, the processor 210 may include a central processing unit (CPU) (not illustrated).

The processor 210 may communicate with a plurality of devices through the communication module 220 by executing application programs which may be stored in the memory 240, may generate a control command and transmit the control command to the plurality of devices or may store, in the memory 240, information, data, or content received from the plurality of devices or may encode a form or format of the information, data, or content into one or more designated forms or formats through the encoder 230, and may stream the information, data, or content to at least one of the plurality of devices through the communication module 220. To this end, the processor 210 may include an image signal processor (not illustrated) and/or a communication processor (not illustrated) therein or separately.

The electronic device 200 may be connected to multiple devices (e.g., the mobile terminal 101, the first display device 301, and the second display device 302) by using the at least one communication module 220. The communication module 220 may include a wireless communication module 223 performing wireless communication including Wi-Fi, ZigBee, Bluetooth, or near-field communication (NFC).

The communication module 220 may include an ultra wide band (UWB) module 221 for performing UWB communication. A short-distance wireless communication method, as an example, UWB communication, may provide a ranging technology for measuring a location (or a distance) of the mobile terminal 101 by performing communication with the mobile terminal 101. UWB is a wireless communication technology capable of using a very wide frequency band of several GHz or more in a baseband without using a radio carrier. Furthermore, the UWB module 221 may provide a radar (radio detection and ranging) function. The radar function may mean a technology for measuring a location and/or distance of a surrounding object and detecting information of the object by using radio waves. The UWB radar technology may mean a technology for measuring a location and/or distance of a target object by using a UWB signal as a radar signal. Hereinafter, embodiments are described based on a technology in which the electronic device 200 measures a location and/or distance of a user or the mobile terminal 101 by using the UWB ranging function, but the disclosure is not limited thereto and may apply at least one of various technologies capable of location and/or distance measurement, for example, a UWB radar and light detection and ranging (LiDAR).

In addition, if the communication module may include a wired communication module (not illustrated), the communication module may be connected to one or more of multiple devices in a wired way, and may communicate with the one or more devices.

The processor 210 may convert a form or format of content received over a network (e.g., the first network 198 or the second network 199 in FIG. 1) or through the mobile terminal 101. For example, the processor 210 may convert a first form or first format of content into a second form or second format, which may be played back in a display device (e.g., the first display device 301 or the second display device 302) to which a streaming service is to be provided among multiple display devices, through the encoder 230. For example, the memory 240 may store various codecs for encoding or decoding content having various forms or formats. The processor 210 may convert content through the encoder 230 by using the codecs.

The memory 240 may store different data that may be used by at least one component (e.g., the processor 210 or the encoder 230) of the electronic device 200. The data may include software (e.g., a program) and input data or output data for an instruction related to the software, for example. The memory 240 may include a volatile memory or a non-volatile memory.

The memory 240 may temporarily store a large amount of data received from the mobile terminal 101 and temporarily store content data processed and converted by the encoder 230, if necessary.

An electronic device (e.g., the electronic device 200 in FIG. 2) according to various embodiments may include wireless communication circuitry (e.g., the communication module 220 in FIG. 2); a memory (e.g., the memory 240 in FIG. 2); and a processor (e.g., the processor 210 in FIG. 2) operatively connected to the memory and the wireless communication circuitry. The processor may be configured to identify a location of a terminal in or approaching an area or a space in which a plurality of display devices have been installed or disposed, select at least one of the plurality of display devices, receive content from the terminal through the wireless communication circuitry, convert a first form of the content into a second form, the second form of the content being supported in the selected at least one display device, and stream the converted content to the selected display device based on a User Datagram Protocol (UDP) protocol.

According to various embodiments, the processor may be configured to identify the location of the terminal by performing UWB ranging with the terminal through the wireless communication circuitry.

According to various embodiments, the processor may be configured to identify the location of the terminal and identify whether the location of the terminal is changed by periodically performing the UWB ranging.

According to various embodiments, the processor may be configured to transmit a turn-on message to the selected display device.

According to various embodiments, the processor may be configured to stream the converted content or content in the second form to the selected display device in accordance with or based on the reception of a response to the turn-on message.

According to various embodiments, the processor may be configured to select a requested display device as the streaming target display device when receiving a streaming request from any one of the plurality of display devices.

According to various embodiments, the processor may be configured to identify whether the location of the terminal is changed and to select another display device of the plurality of display devices based on a changed location when the location is changed.

According to various embodiments, the processor may be configured to transmit a turn-on message to the another display device and to stream the content to the another display device in accordance with or based on a response from the another display device. In some embodiments, the processor may be configured to convert the content in the first or second form to content in a third form and to stream the content in a third form to the another display device, the third from being a form supported by the another display device. In some embodiments, the first form and the second form may be different. In some embodiments, the third form and the second form may be different.

According to various embodiments, the processor may be configured to transmit a turn-off message to the display device and to stream the content to the another display device without checking whether a response to the turn-off message is received.

According to various embodiments, the processor may be configured to obtain information for providing a streaming service to the plurality of display devices by performing initial communication with the plurality of display devices and to store the information in the memory.

Figure 3:
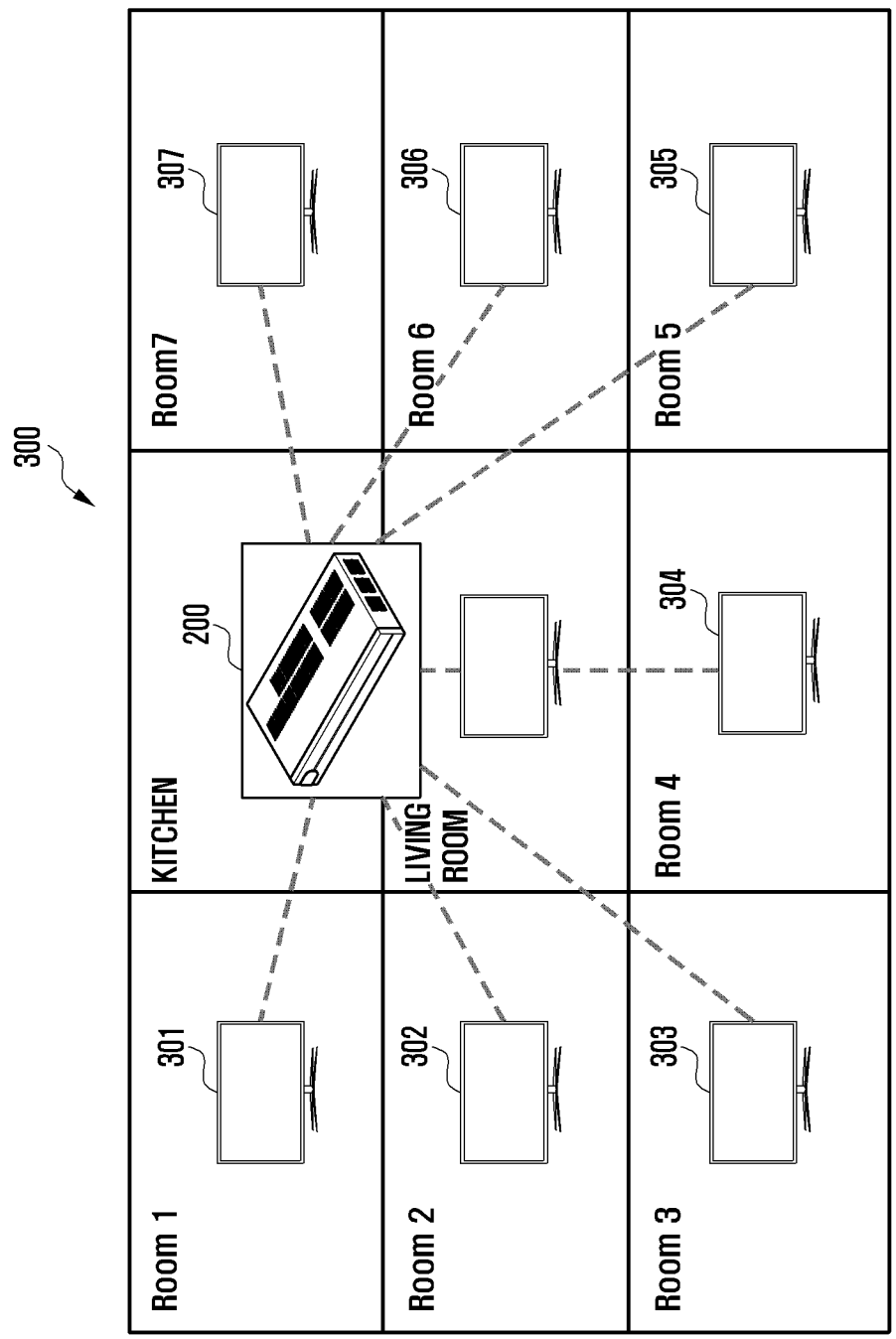
FIG. 3 is a diagram illustrating an example of an operation of providing, by the electronic device, a streaming service through at least one of a plurality of display devices based on communication with the mobile terminal according to various embodiments.

FIG. 3 is a diagram illustrating an example of an operation of providing, by the electronic device 200, a streaming service through at least one of a plurality of display devices 301 to 307 based on communication with the mobile terminal 101 according to various embodiments. In the example of FIG. 3, the electronic device 200 and the plurality of display devices 301 to 307 may be disposed in a building, an office space, a predefined area, rooms in a home 300, or a living room of a home 300 with subareas, each of the above-mentioned places may be a designated area or space, but the disclosure is not limited thereto. In some embodiments, area or space may include a local area or a communication area of the wireless communication circuitry. As an example, the area or space may include any location (or distance) within which a short distance wireless communication method, e.g., UWB communication, may be performed by the wireless communication circuitry. Furthermore, the number of plurality of display devices 301 to 307 is not limited thereto, and may be two or more. As an example, rooms partially or entirely separated from one another, a living room, and a kitchen may be subareas that may be included in the home 300 of FIG. 3. Space information or area information including a location and size of each subarea of the home 300 may be previously stored in a memory of the electronic device 200, and may be used by the electronic device 200 when a location of a user or the mobile terminal 101 is identified, for example. A short-distance wireless communication method, as an example, UWB communication, may provide a ranging technology for measuring a location (or a distance) of the mobile terminal 101 by performing communication with the mobile terminal 101.

According to an embodiment, the mobile terminal 101 may be carried by a user, for example. The user may play back multimedia content including a video image through the mobile terminal 101.

According to an embodiment, when a user accesses the home 300 while watching content through the mobile terminal 101 outside the home, the processor 210 of the electronic device 200 may connect communication with the mobile terminal 101, and may receive content that is being played back through the mobile terminal 101. For example, the electronic device 200 may enable content to be played back by being streamed seamlessly to the display device 307 installed in a living room that is first accessed by the mobile terminal 101 through a front entrance. In this case, although a streaming service request from a user is not present, the electronic device 200 may detect that the mobile terminal 101 approaches the home 300, may connect the mobile terminal 101 with the corresponding display device 307 in accordance with or based on the approach, may turn on the corresponding display device 307, and may stream content.

According to an embodiment, when a user requests a service in order to play back content through one of the plurality of display devices 301 to 307 while playing back the corresponding content through the mobile terminal 101 in the home 300, the electronic device 200 may identify a location of the mobile terminal 101, and may enable content to be streamed and played back in one display device (e.g., the first display device 301) selected based on the identified location.

In this case, the electronic device 200 may enable the content to be played back by being streamed to the selected display device in accordance with or based on the streaming service request of the user through the mobile terminal 101. To this end, the electronic device 220 may identify the location of the mobile terminal 101 periodically or in response to the service request, for example, may select, as a display device to which the service will be provided, the first display device 301 that has approached the identified location, and may turn on the first display device 301.

According to an embodiment, the electronic device 200 may identify the location of the mobile terminal 101 by performing communication with the mobile terminal 101 that approaches the home 300 from the outside or that moves in the home 300, for example, UWB ranging.

The electronic device 200 and the mobile terminal 101 may perform UWB ranging by using various methods. For example, the electronic device 200 according to an embodiment of the disclosure may perform one-sided two-way ranging and/or double-sided two-way ranging (DS-TWR) along with the mobile terminal 101.

According to the one-sided two-way ranging, the electronic device 200 may perform ranging by measuring round-trip delay between one message transmitted and a response returned between the electronic device 200 and the mobile terminal 101. The double-sided two-way ranging is an extension of the one-sided two-way ranging. In the double-sided two-way ranging, two round-trip time measurements may be performed, and a time-of-flight (TOF) result may be derived by combining the two round-trip time measurements.

According to an embodiment, the electronic device 200 may detect a user and identify a location of the user by using at least one sensor (not illustrated) installed in the home 300.

According to an embodiment, when identifying a location of the mobile terminal 101, the processor 210 of the electronic device 300 may select a display device closest to the identified location or a display device installed at a location identified as one subarea (e.g., a room or a living room) according to the partition of a home. The electronic device 200 may turn on the selected display device, and may enable content received from the mobile terminal 101 to be streamed and played back in the selected display device.

In order to identify the location of the mobile terminal 101, the electronic device 300 may previously store information, for example, a location and direction of a subarea (a living room, a kitchen, Room 1 to Room 7) according to the partition of the home 300 illustrated in FIG. 3, and the size of the area.

The electronic device 200 may previously register and store pieces of information, for example locations of display devices installed in respective subareas of the home 300, an identifier including a communication IP, a communication port, resolution, and a supportable codec. To this end, as a server, the electronic device 200 may broadcast a beacon packet, may receive information from the plurality of display devices 301 to 307 that respond to the beacon packet, and may configure a network by configuring the display devices as respective clients.

According to an embodiment, the electronic device 200 may stream content to at least one of the plurality of display devices 301 to 307 based on the UDP protocol, for example.

Figure 4:
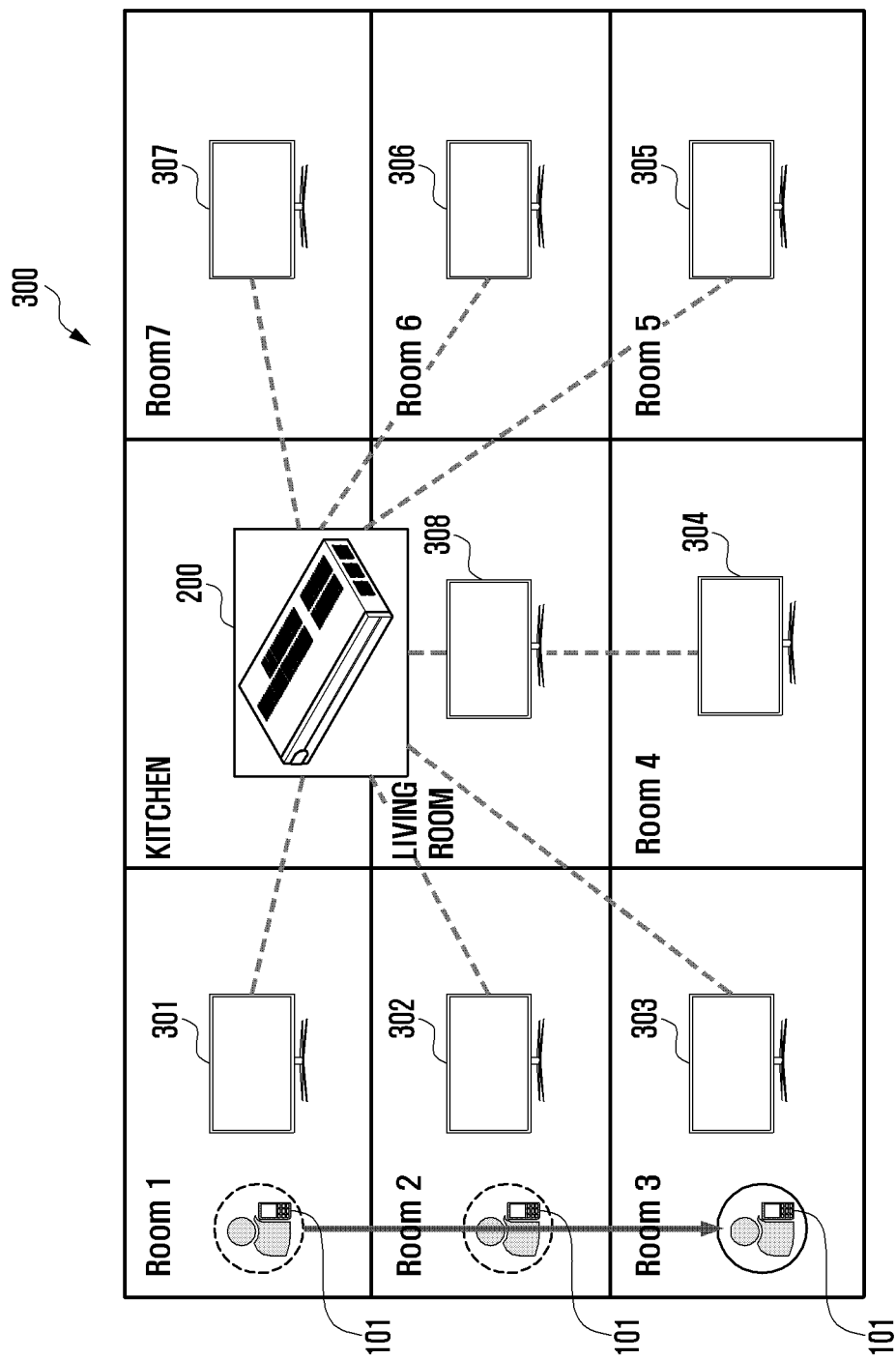
FIG. 4 is a diagram illustrating an example of an operation of providing, by an electronic device, a streaming service through another display device of the plurality of display devices based on a movement of a mobile terminal according to various embodiments.

FIG. 4 is a diagram illustrating an example of an operation of providing, by an electronic device (e.g., the electronic device 200 in FIG. 2), a streaming service through another display device of the plurality of display devices 301 to 307 based on a movement of a mobile terminal (e.g., the mobile terminal 101 in FIG. 2) according to various embodiments.

As illustrated, the mobile terminal 101 may be initially disposed in Room 1, and may move to Room 3 after passing through Room 2.

According to an embodiment, while playing back content through the mobile terminal 101 in the home 300, a user may request the first display device 301 to be turned on and a streaming service to be provided through the corresponding device.

The electronic device 200 may receive the turn-on request from the first display device 301 that has been turned on or the mobile terminal 101, may receive content from the mobile terminal 101, may convert a form or format of the received content into a codec form or format supported by the first display device 301 by performing encoding on the received content again, and may stream the converted content to the first display device 301.

According to an embodiment, the electronic device 200 may identify a location of the mobile terminal 101 by periodically, for example, performing UWB ranging on the mobile terminal 101 that moves in the home 300 along with the mobile terminal 101.

The electronic device 200 may identify a location of the mobile terminal 101, and may identify that the identified location is Room 2 not Room 1 and a display device disposed in a corresponding area is the second display device 302 not the first display device 301.

The electronic device 200 may select and turn on the second display device 302, and may stream the converted content to the second display device 302. In some embodiments, the electronic device 200 may select and turn on the second device 302 without another streaming service request from the user and/or a display device. In this case, the electronic device 200 may convert a form or format of the converted content into a form or format of a codec supported by the second display device 302 by encoding the converted content again. Furthermore, the electronic device 200 may turn off the first display device 301.

Thereafter, the location of the mobile terminal 101 is changed again. The electronic device 200 may identify that a location of the mobile terminal 101 is Room 3 not Room 2 and a display device disposed in a corresponding area is the third display device 303 not the second display device 302.

The electronic device 200 may select and turn on the third display device 303, and may stream the converted content to the third display device 303. In some embodiments, the electronic device 200 may select and turn on the third display device 303 without another streaming service request from the user and/or a display device. In this case, the electronic device 200 may convert a form or format of the converted content into a form or format of a codec supported by the third display device 303 by encoding the converted content again. Furthermore, the electronic device 200 may turn off the second display device 302.

Figure 5:
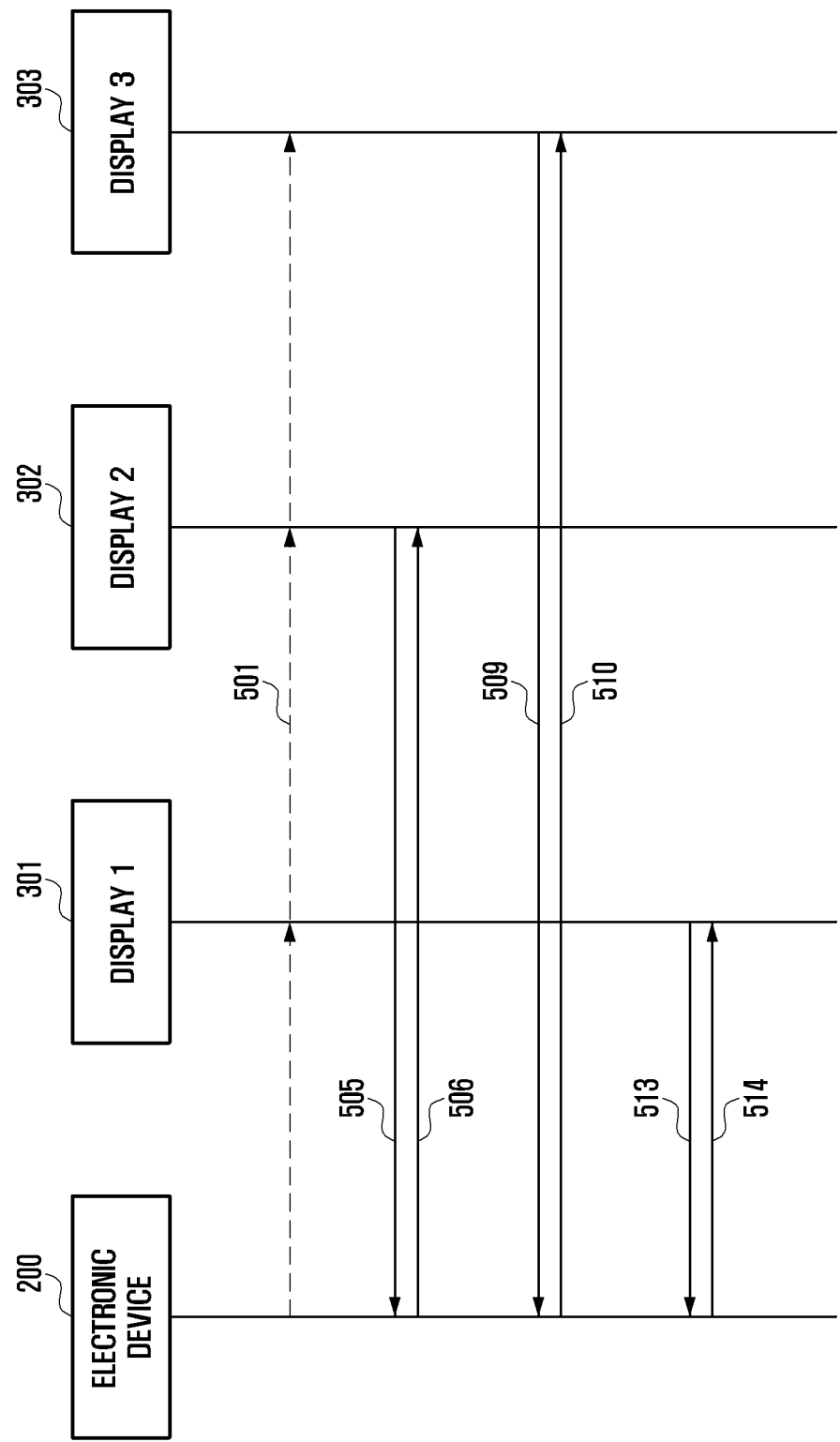
FIG. 5 is a diagram illustrating an example of an operation of previously registering, by an electronic device according to various embodiments, a plurality of display devices.

FIG. 5 is a diagram illustrating an example of an operation of previously registering, by an electronic device according to various embodiments, a plurality of display devices.

With reference to FIG. 5, an electronic device (e.g., the electronic device 200 in FIG. 2) may obtain and store information on a display device (e.g., the first to third display devices 301, 302 or 303 in FIG. 3) disposed in each subarea of the home 300 or when the display device is installed in a home (e.g., the home 300 in FIG. 3). The number and locations of display devices are not limited to contents described in this document, and may be embodied as two or more various numbers and various locations.

For example, the electronic device 200 may previously register and store information of each of display devices by performing mutual communication based on initial driving when the display device is first installed in the home 300 or based on initial driving when the display device 301, 302, . . . or 307 is installed in each subarea of the home 300. The above-mentioned information may include pieces of information, for example, a location of each display device, an identifier including a communication IP, a communication port, resolution, or a supportable codec.

According to an embodiment, in operation 501, as a server, the electronic device 200 may periodically broadcast a beacon packet to the plurality of display devices 301 to 307 for an initial connection.

According to an embodiment, the second display device 302 that has received the beacon may transmit, to the electronic device 200, a connection request including device information in operation 505, and may receive acknowledgment for the connection request in operation 506.

According to an embodiment, the third display device 303 that has received the beacon may transmit, to the electronic device 200, a connection request including device information in operation 509, and may receive acknowledgment for the connection request in operation 510.

According to an embodiment, the first display device 301 that has received the beacon may transmit, to the electronic device 200, a connection request including device information in operation 513, and may receive acknowledgment for the connection request in operation 514.

As the display devices 301, 302, and 303 that have received the beacon broadcasted by the electronic device 200 transmit the connection requests to the electronic device 200 and receive the acknowledgments for the connection requests, the electronic device 200 may store information on the plurality of display devices 301, 302, and 303, and may perform signal communication for control of each device and/or data communication for content streaming based on the information.

Figure 6:
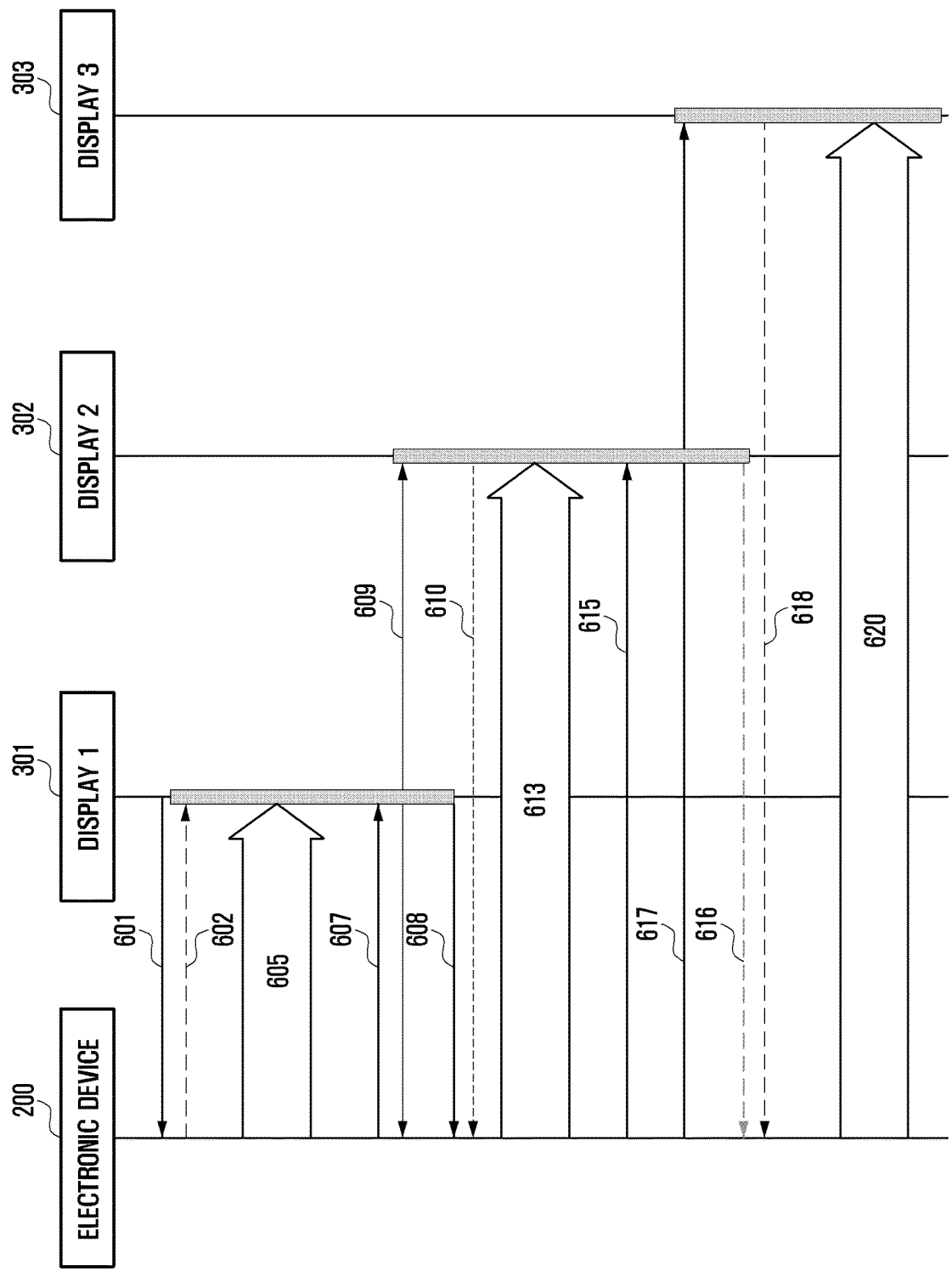
FIG. 6 is a diagram illustrating an example of a signal flow according to an operation of providing, by an electronic device according to various embodiments, a streaming service through at least one of a plurality of display devices based on a location of a mobile terminal.

FIG. 6 is a diagram illustrating an example of a signal flow according to an operation of providing, by an electronic device (e.g., the electronic device 200 in FIG. 2) according to various embodiments, a streaming service through at least one of a plurality of display devices (e.g., the first to third display devices 301, 302, and 303 in FIG. 3) based on a location of a mobile terminal (e.g., the mobile terminal 101 in FIG. 2). The number and locations of display devices are not limited to contents described in this document, and may be embodied as two or more various numbers and various locations.

With reference to FIG. 6, as the first display device 301 is turned on, in order to request a streaming service, the first display device 301 may transmit a turn-on request to the electronic device 200 in operation 601. For example, the first display device 301 that has received a streaming service request from the mobile terminal 101 may request, from the electronic device 200, that content provided by the mobile terminal 101 needs to be streamed to the first display device 301 by transmitting a turn-on request to the electronic device 200 in order to perform the streaming service.

Figure 7:
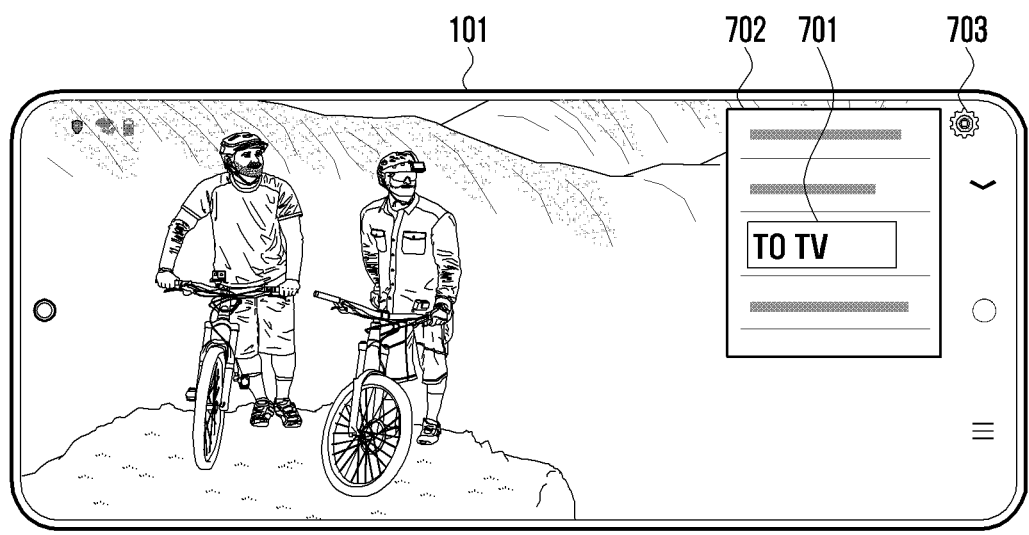
FIG. 7 is a diagram illustrating an example of a user interface of the mobile terminal for requesting a streaming service from the electronic device according to various embodiments.

FIG. 7 is a diagram illustrating an example of a user interface of the mobile terminal 101 for requesting a streaming service from the electronic device 200 according to various embodiments.

With reference to FIG. 7, while video content is played back in the mobile terminal 101, a user may enable a pop-up menu or a top-down menu 702 to be displayed by touching a specific icon or menu (e.g., a configuration icon 703), for example, for a streaming service request.

The menu 702 may include a button or icon 701 for selecting a service (e.g., a streaming service) for playing back, in a display device, content being played back in the mobile terminal 101. When the streaming service icon 701 is selected, the first display device 301 that has received a corresponding service provision request may transmit a turn-on request to the electronic device 200.

With reference back to FIG. 6, according to an embodiment, the electronic device 200 may transmit a response message to the first display device 301 in operation 602 and then stream the content to the first display device 301 in operation 605.

According to an embodiment, the electronic device 200 may stream the content to the display device 301 based on the UDP protocol, for example. The electronic device 200 may perform the streaming to the first display device 301 through an initially configured communication port based on the UDP protocol, and may not require a separate operation for a communication connection.

Unlike in a connection-oriented protocol such as a TCP, in the case of a UDP, an information transmission and reception operation (e.g., 3-way handshake) for an initial communication connection does not need to be performed. Furthermore, in order to avoid a process for the initial communication connection, an operation (e.g., a TCP keep-alive option) for maintaining the communication connection does not need to be performed or accordingly the electronic device 200 and all of display devices do not need to be always turned on. Accordingly, overhead for constructing a communication session or maintaining a connection by using UDP communication is not required, and corresponding streaming delay can also be reduced.

The electronic device 200 may receive content being now played back from the mobile terminal 101, for example, may convert a form or format of the received content into a form or format of a codec supported by the first display device 301 by performing encoding again, and may stream the converted content to the first display device 301.

The electronic device 200 may identify a location of the mobile terminal 101 in the home 300, and may identify that the identified location is Room 2 not Room 1 and a display device disposed in a corresponding area is the second display device 302 not the first display device 301.

In operation 607, the electronic device 200 may transmit a turn-off request to the first display device 301.

In operation 609, the electronic device 200 may transmit a turn-on request to the second display device 302. Accordingly, when receiving a response message from the second display device 302 in operation 610, the electronic device 200 may stream the content to the second display device in operation 613. In this case, the electronic device 200 may convert a form or format of the converted content into a form or format of a codec supported by the second display device 302 by encoding the converted content again.

In operation 608, the electronic device 200 may receive a response for the turn-off request for the first display device 301. For example, the operation of transmitting, by the electronic device 200, the turn-on request to the second display device 302 in operation 609 can be performed before the electronic device 200 receives the turn-off response message from the first display device 301 in operation 608. Accordingly, streaming delay according to a device change can be minimized.

Thereafter, the location of the mobile terminal 101 is changed again. The electronic device 200 may identify that a location of the mobile terminal 101 is Room 3 not Room 2 and a display device disposed in a corresponding area is the third display device 303 not the second display device 302.

The electronic device 200 may transmit a turn-off request to the second display device 302 in operation 615, and may transmit a turn-on request to the third display device 303 in operation 617. In operation 616, the electronic device 200 may receive a response to the turn-off from the second display device 302.

As the electronic device 200 receives a response message from the second display device 303 in operation 618, the electronic device 200 may stream the converted content to the third display device 303 in operation 620. In this case, the electronic device 200 may convert a form or format of the converted content into a form or format of a codec supported by the third display device 303 by encoding the converted content again.

Figure 8:
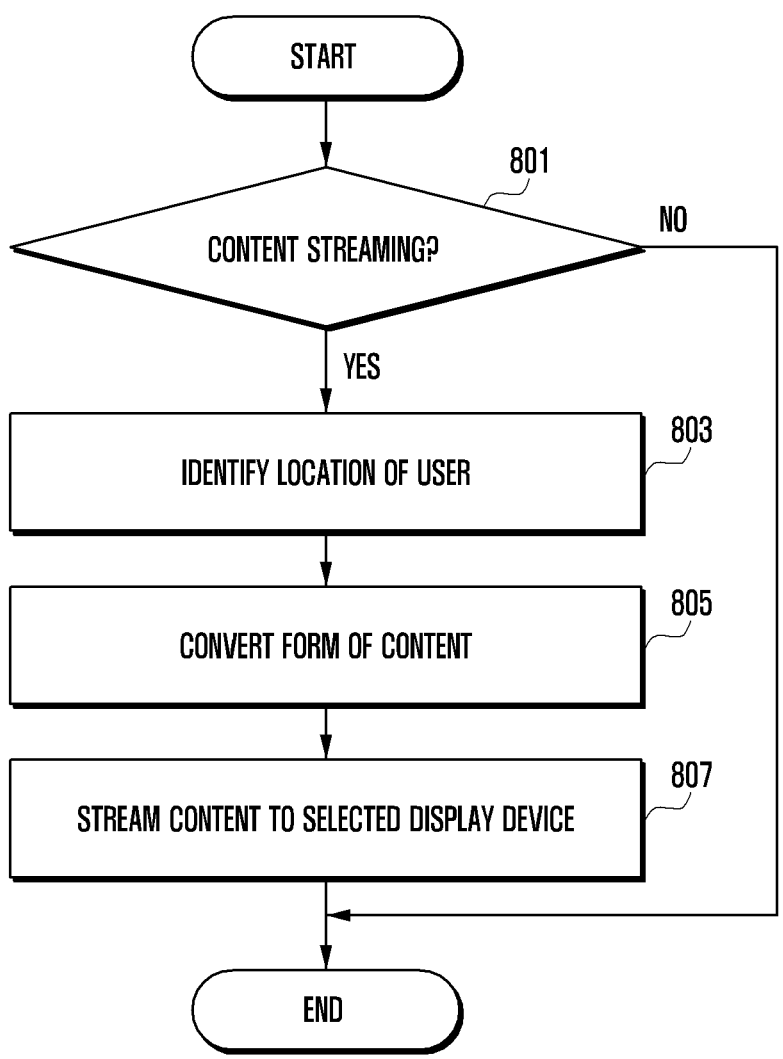
FIG. 8 is a diagram illustrating an example of an operation of providing, by an electronic device according to various embodiments, a streaming service.

FIG. 8 is a diagram illustrating an example of an operation of providing, by an electronic device (e.g., the electronic device 200 in FIG. 2) according to various embodiments, a streaming service.

According to an embodiment, in operation 801, the electronic device 200 may determine whether to provide a content streaming service. For example, the electronic device 200 may determine whether to continue to provide a content streaming service according to a movement of the mobile terminal 101 while providing a content streaming service. For example, the electronic device 200 may determine whether to provide a content streaming service based on a request for the content streaming service from a mobile terminal (e.g., the mobile terminal 101 in FIG. 2) or at least one (e.g., the first display device 301) of a plurality of display devices (e.g., the first to eighth display devices 301 to 307 in FIG. 3).

According to an embodiment, in operation 803, the electronic device 200 may identify a location of the mobile terminal 101 or a location of a user. For example, the electronic device 200 may identify a location of the mobile terminal 101 through UWB communication with the mobile terminal 101. As another example, the electronic device 200 may detect a user and identify a location of the user by using at least one sensor (not illustrated) installed in the home 300. The electronic device 220 may identify a location of the mobile terminal 101 periodically or in response to a service request, for example.

According to an embodiment, the electronic device 200 may identify a location of the mobile terminal 101 or a location of a user, and may select, as a streaming service provision target, a display device disposed in a subarea of the identified location or a display device (e.g., the first display device 301) from which a streaming request has been received.

According to an embodiment, in operation 805, the electronic device 200 may receive content from the mobile terminal 101, and may convert a form or format of the received content into a form or a format supported in the selected display device. For example, the electronic device 200 may identify a supported codec with reference to information on the selected display device, and may encode the received content by using the corresponding codec.

In operation 807, the electronic device 200 may stream and transmit the content by enabling the selected display device to be turned on. The electronic device 200 may stream the content to the selected display device 301 based on the UDP protocol, for example.

Figure 9:
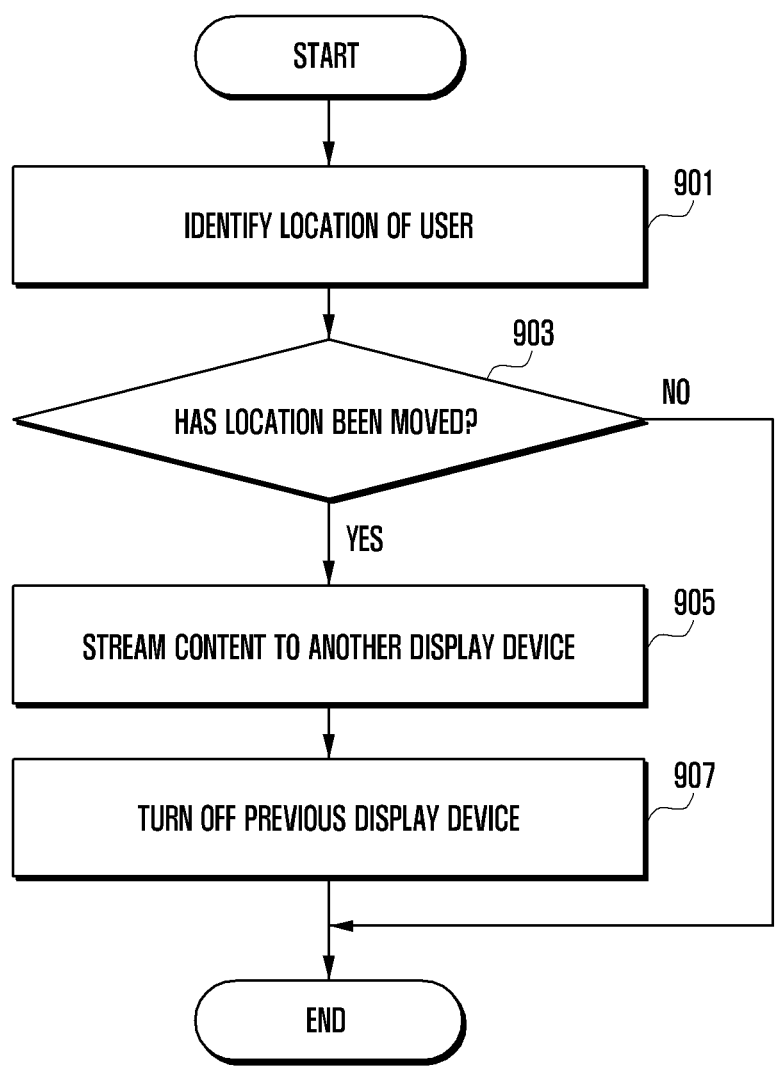
FIG. 9 is a diagram illustrating an example of an operation of providing, by an electronic device according to various embodiments, a streaming service according to a movement of a mobile terminal.

FIG. 9 is a diagram illustrating an example of an operation of providing, by an electronic device (e.g., the electronic device 200 in FIG. 2) according to various embodiments, a streaming service according to a movement of a mobile terminal (e.g., the mobile terminal 101 in FIG. 2).

According to an embodiment, in operation 901, the electronic device 200 may identify a location of the mobile terminal 101 in the home 300 periodically or in response to a request. For example, the electronic device 200 may identify a location of the mobile terminal 101 while providing a streaming service through the first display device 301. For example, the electronic device 200 may identify a location of the mobile terminal 101 by periodically performing UWB ranging along with the mobile terminal 101.

According to an embodiment, in operation 903, the electronic device 200 may identify whether a location of the mobile terminal 101 has changed to a subarea where another display device (e.g., the second display device 302) is disposed as the location of the mobile terminal 101 is moved.

According to an embodiment, as a location of the mobile terminal 101 is moved to a subarea of another display device, in operation 905, the electronic device 200 may turn on the another display device and stream content. For example, the electronic device 200 may transmit a turn-on message to the second display device 302 without an additional operation for releasing a communication connection with the first display device 301, and may start content streaming after checking a response thereto. For example, the electronic device 200 may stream content to the display device 301, after transmitting a turn-on message to the second display device 302 through a previously stored communication port and receiving a response thereto without an additional operation for a communication session configuration based on the UDP protocol.

Furthermore, in operation 907, the electronic device 200 may transmit a turn-off signal to a previous display device (the first display device 301). For example, the electronic device 200 may provide a streaming service by transmitting a turn-off message without an additional operation for releasing a communication connection with the first display device 301 and turning on the second display device 302 even without a response thereto.

Embodiments disclosed in this document have been merely presented as examples for easily describing technical contents and helping understanding of the technical contents, but are not intended to limit the scope of the technology disclosed in this document. Accordingly, the scope of the technology disclosed in this document should be construed as including all changes or modified forms derived based on the technical spirit of various embodiments disclosed in this document in addition to the embodiments disclosed herein.

The invention claimed is:

1. An electronic device comprising:
a wireless communication circuitry;
memory; and
a processor operatively connected to the memory and the wireless communication circuitry,
wherein the memory stores instructions which, when executed by the processor, cause the electronic device to:
store information on locations and identifiers of a plurality of display devices installed in subareas of a specific area and forms of content supported in the plurality of display devices, wherein the information is acquired by the electronic device during configuring a network with the plurality of display devices,
identify a first location of a terminal and a subarea of the specific area corresponding to the first location based on the information on the locations and the identifiers of the plurality of display devices,
select one of the plurality of display devices installed in the subarea corresponding to the first location, receive from the terminal, content in a first form, and convert the first form of the content received from the terminal into a second form of the content received from the terminal, the second form of the content received from the terminal being supported in the selected one display device, stream, to the selected one display device, the second form of the content received from the terminal based on a User Datagram Protocol (UDP) protocol, detect a movement of the terminal and identify a second location of the terminal, the second location corresponding to a second subarea of the specific area, select another display device of the plurality of display devices installed in the second subarea corresponding to the second location, receive from the terminal, the content in the first form, and convert the first form of the content received from the terminal into a third form of the content received from the terminal, the third form of the content received from the terminal being supported in the another display device, stream to the another display device, the third form of the content received from the terminal to the another display device based on the UDP protocol, and transmit a turn-off message to the selected one display.

2. The electronic device of claim 1, wherein the memory further stores instructions which, when executed by the processor, cause the electronic device to identify the first location of the terminal or the second location of the terminal by performing ultra wide band (UWB) ranging with the terminal through the wireless communication circuitry.

3. The electronic device of claim 2, wherein the memory further stores instructions which, when executed by the processor, cause the electronic device to identify a location of the terminal and identify whether the location of the terminal is changed by periodically performing the UWB ranging.

4. The electronic device of claim 1, wherein the memory further stores instructions which, when executed by the processor, cause the electronic device to transmit a turn-on message to the selected one display device.

5. The electronic device of claim 4, wherein the memory further stores instructions which, when executed by the processor, cause the electronic device to stream the content in the second form, to the selected one display device based on a reception of a response to the turn-on message.

6. The electronic device of claim 1, wherein the memory further stores instructions which, when executed by the processor, cause the electronic device to select a requested display device as a streaming target display device based on a streaming request being received from any one of the plurality of display devices.

7. The electronic device of claim 1, wherein the memory further stores instructions which, when executed by the processor, cause the electronic device to transmit a turn-on message to the another display device, and to stream the third form of the content received from the terminal to the another display device based on a response to the turn-on message from the another display device.

8. The electronic device of claim 7, wherein the memory further stores instructions which, when executed by the processor, cause the electronic device to stream the content to the another display device without checking whether a response to the turn-off message is received from the selected one display device.

9. The electronic device of claim 1, wherein the memory further stores instructions which, when executed by the processor, cause the electronic device to obtain information for providing a streaming service to the plurality of display devices by performing initial communication with the plurality of display devices and to store the information in the memory.

10. A method of using an electronic device, comprising:
storing, by the electronic device, information on locations and identifiers of a plurality of display devices installed in subareas of a specific area and forms of content supported in the plurality of display devices, wherein the information is acquired by the electronic device during configuring a network with the plurality of display devices, identifying, by the electronic device, a first location of a terminal and a subarea of the specific area corresponding to the first location based on the information on the locations and the identifiers of the plurality of display devices, selecting, by the electronic device, one of the plurality of display devices installed in the subarea corresponding to the first location, receiving, by the electronic device and from the terminal, content in a first form through a wireless communication circuitry of the electronic device and convert the first form of the content received from the terminal into a second form of the content received from the terminal, the second form of the content received from the terminal being supported in the selected one display device;

streaming, by the electronic device to the selected one display device, the second form of the content received from the terminal based on a User Datagram Protocol (UDP) protocol, detecting, by the electronic device, a movement of the terminal and identify a second location of the terminal, the second location corresponding to a second subarea of the specific area, selecting, by the electronic device, another display device of the plurality of display devices installed in the second subarea corresponding to the second location, receiving, by the electronic device and from the terminal, the content in the first form through the wireless communication circuitry of the electronic device and convert the first form of the content received from the terminal into a third form of the content received form the terminal, the third form of the content received from the terminal being supported in the another display device, streaming, by the electronic device to the another display device, the third form of the content received from the terminal based on the UDP protocol, and transmitting, by the electronic device, a turn-off message to the selected one display device.

11. The method of claim 10, wherein identifying the first location of the terminal or the second location of the terminal comprises identifying, by the electronic device, the first location of the terminal or the second location of the terminal by performing UWB ranging with the terminal.

12. The method of claim 11, further comprising identifying, by the electronic device, a location of the terminal and identifying whether the location of the terminal is changed by periodically performing the UWB ranging.

13. The method of claim 10, further comprising transmitting, by the electronic device, a turn-on message to the selected one display device.

14. The method of claim 13, further comprising receiving, by the electronic device, a response to the turn-on message,
wherein streaming the content in the second form comprises streaming, by the electronic device, the content in the second form to the selected one display device based on the reception of the response.

15. The method of claim 10, further comprising receiving, by the electronic device, a streaming request from any one of the plurality of display devices,
wherein selecting the one of the plurality of display devices comprises selecting, by the electronic device, a requested display device as a streaming target display device.

16. The method of claim 10, further comprising:
transmitting, by the electronic device, a turn-on message to the another display device; and
streaming, by the electronic device, the third form of the content received from the terminal to the another display device based on a response to the turn-on message from the another display device.

17. The method of claim 16, wherein the content is streamed by the electronic device to the another display device without checking whether a response to the turn-off message is received from the selected one display device.

18. The method of claim 10, further comprising obtaining, by the electronic device, information for providing a streaming service to the plurality of display devices by performing initial communication with the plurality of display devices and storing the information in a memory.

* * * * *